W. H. BROWN.
CALCULATING MACHINE.
APPLICATION FILED FEB. 19, 1920.

1,426,710.

Patented Aug. 22, 1922.
12 SHEETS—SHEET 2.

INVENTOR
William H. Brown
BY
Parsons & Bodell
ATTORNEYS

W. H. BROWN.
CALCULATING MACHINE.
APPLICATION FILED FEB. 19, 1920.

1,426,710.

Patented Aug. 22, 1922.
12 SHEETS—SHEET 7.

INVENTOR.
William H. Brown.
BY Parsons & Bodell.
ATTORNEYS.

W. H. BROWN.
CALCULATING MACHINE.
APPLICATION FILED FEB. 19, 1920.
1,426,710.
Patented Aug. 22, 1922.
12 SHEETS—SHEET 8.
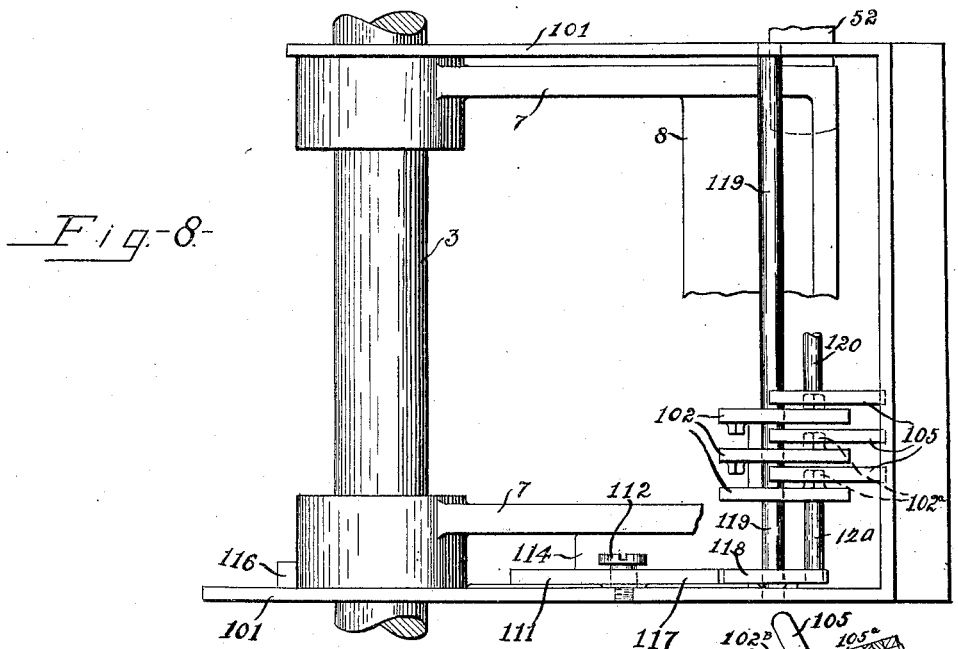
Fig.-8-
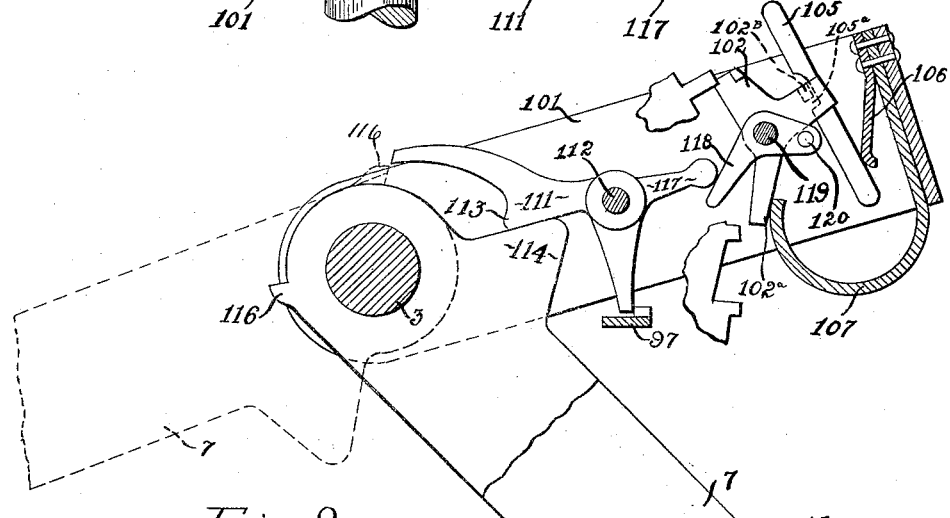
Fig.-9-
INVENTOR.
William H. Brown
BY
Parnes & Brdell
ATTORNEYS.

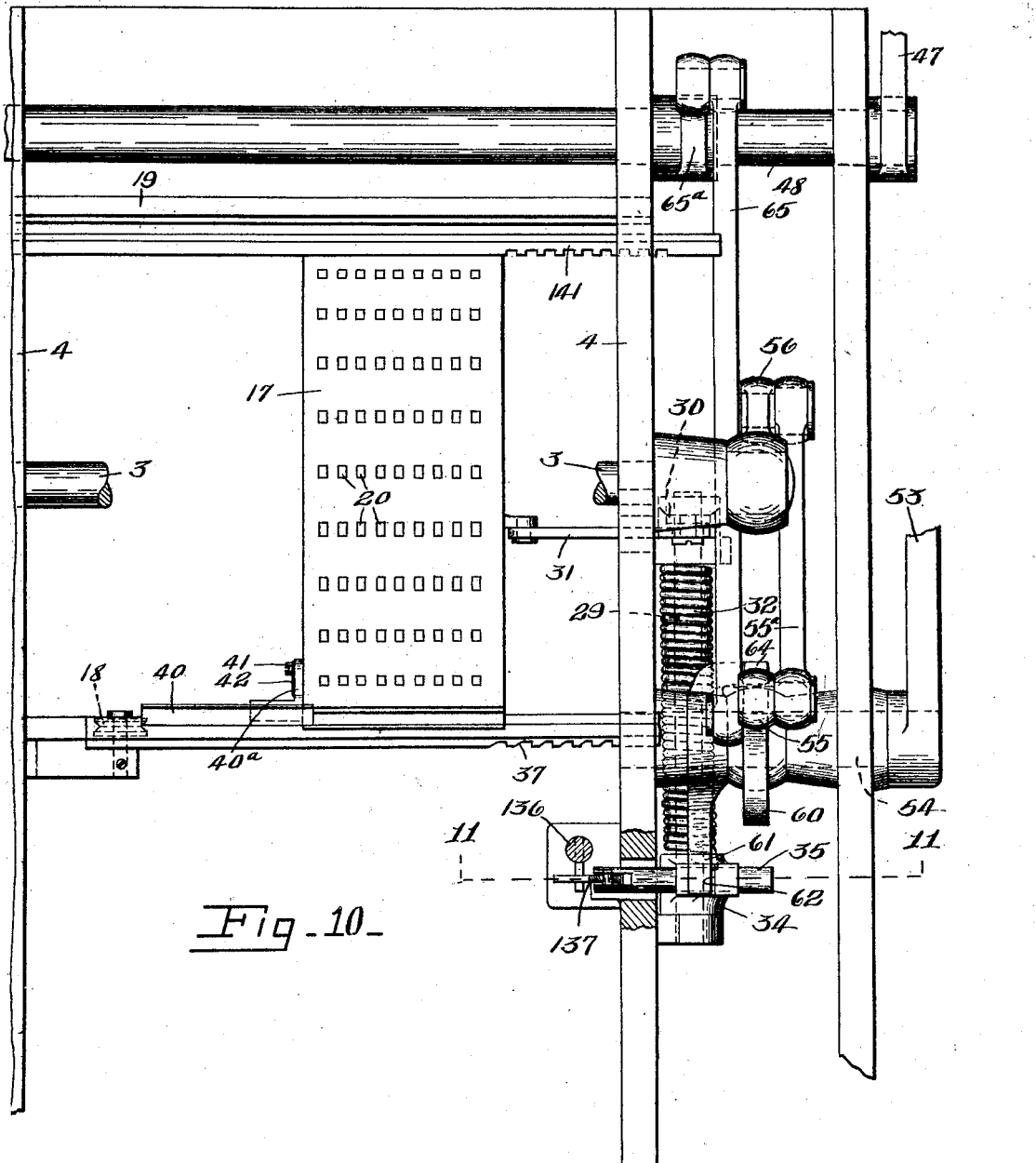

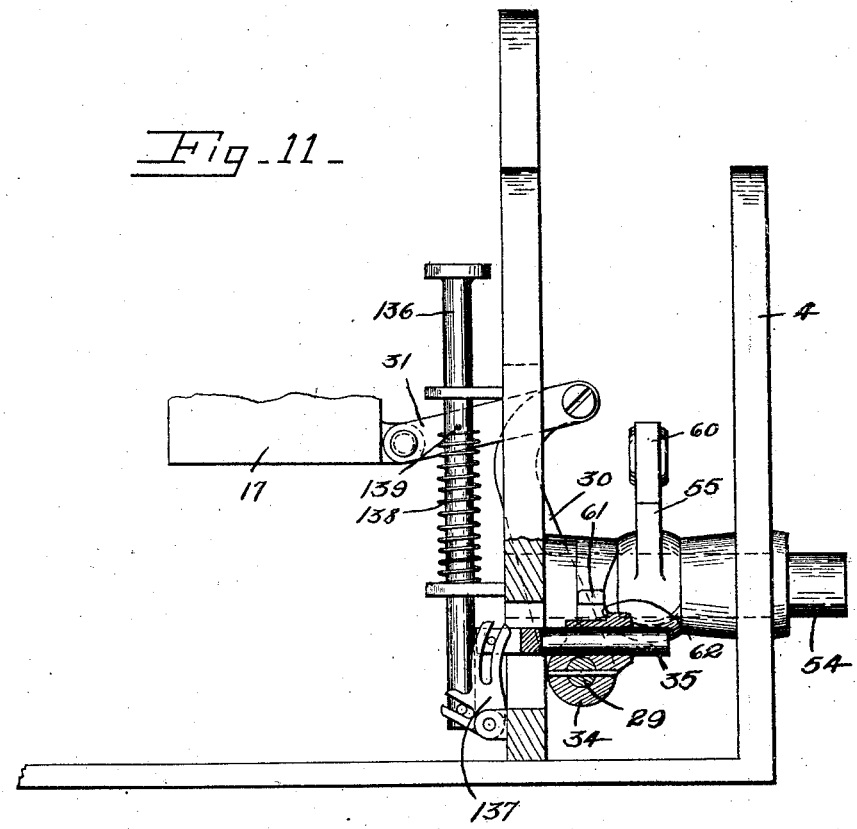

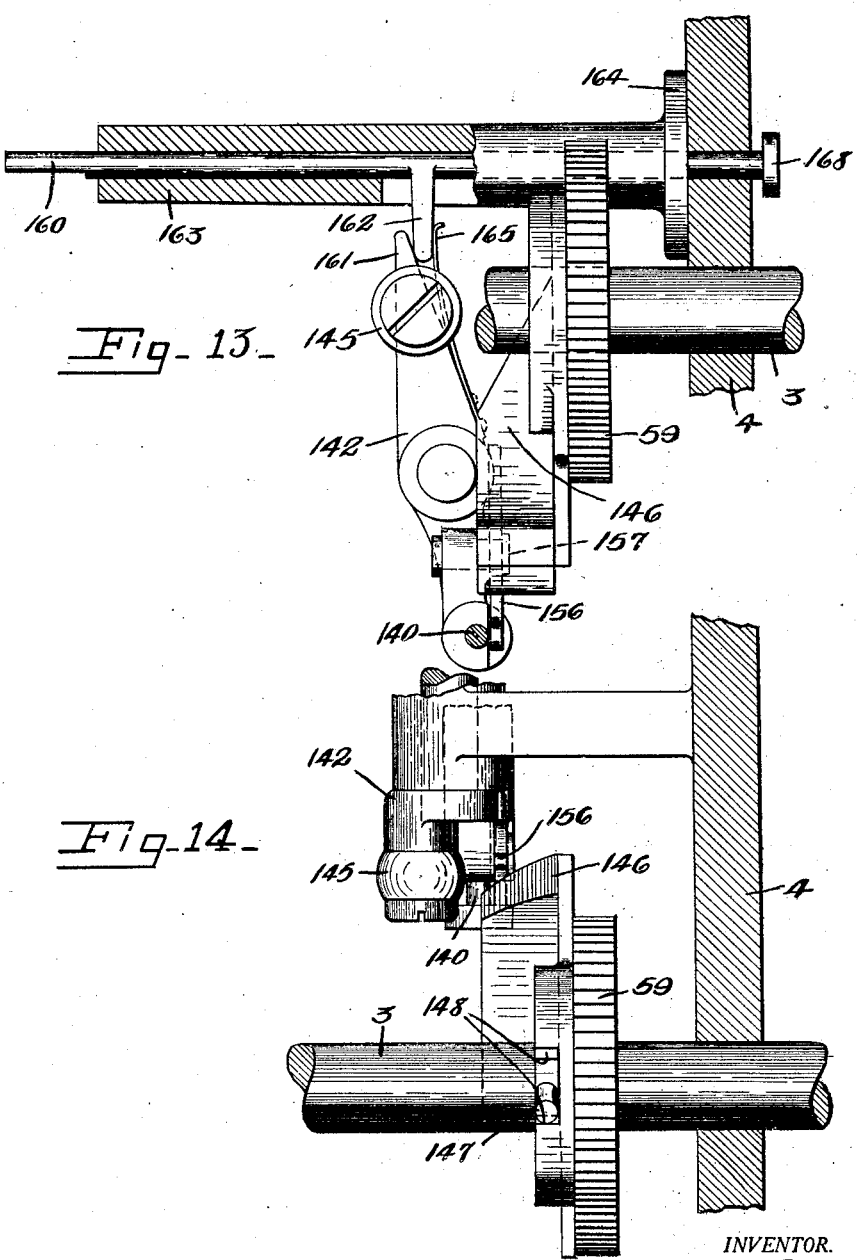

UNITED STATES PATENT OFFICE.

WILLIAM H. BROWN, OF SYRACUSE, NEW YORK, ASSIGNOR TO H. H. FRANKLIN MFG. COMPANY, OF SYRACUSE, NEW YORK, A CORPORATION OF NEW YORK.

CALCULATING MACHINE.

1,426,710.    Specification of Letters Patent.    Patented Aug. 22, 1922.

Application filed February 19, 1920. Serial No. 359,817.

*To all whom it may concern:*

Be it known that I, WILLIAM H. BROWN, a citizen of the United States, and a resident of Syracuse, in the county of Onondaga and State of New York, have invented a certain new and useful Calculating Machine, of which the following is a specification.

This invention relates to calculating machines, and has for its object a particularly simple, efficient and compact computing mechanism and also an especially simple and compact arrangement of the various mechanisms. The invention consists in the novel features and in the combinations and constructions hereinafter set forth and claimed.

In describing this invention, reference is had to the accompanying drawings in which like characters designate corresponding parts in all the views.

Figure 3:
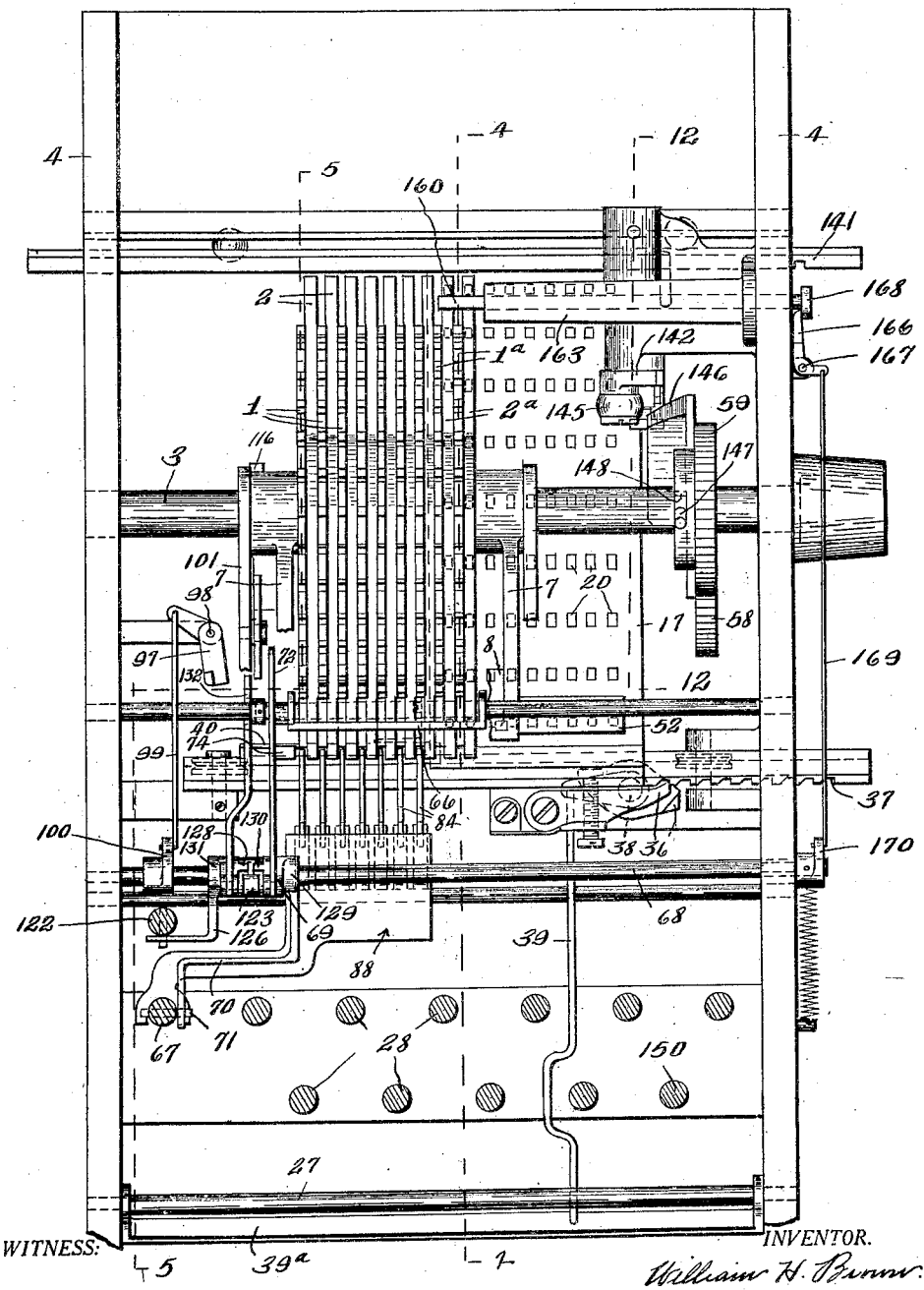
Figure 3 is a plan view, partly in section, showing parts omitted from Fig. 1.

Figure 3ª is an enlarged fragmentary view of parts of the total and clearing mechanism seen in Fig. 3.

Figure 4:
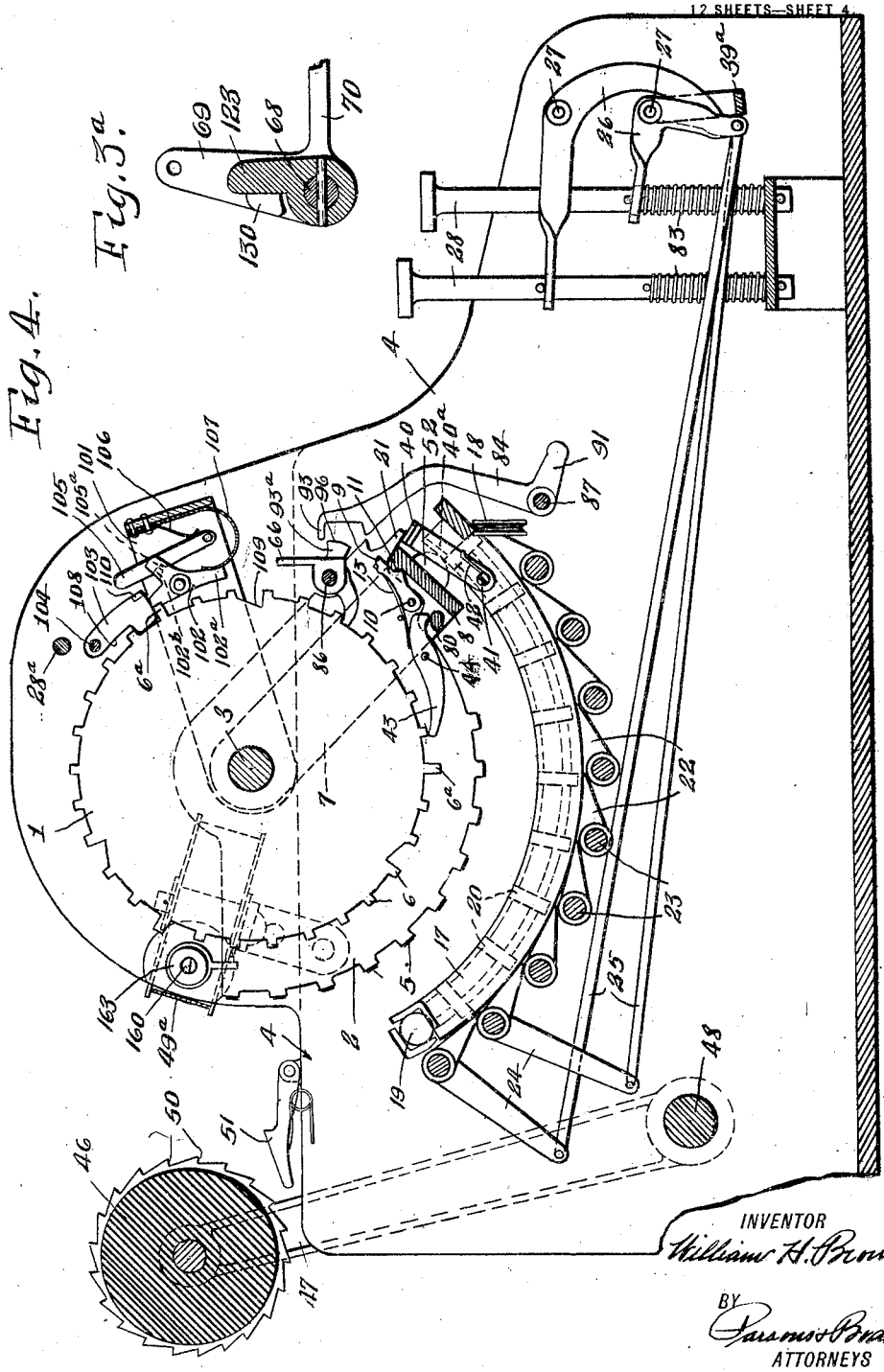

Figure 4 is a longitudinal vertical sectional view taken on the plane of line 4—4, Fig. 3, illustrating the position of the calculating mechanism at the beginning of the computing operation.

Figure 5:
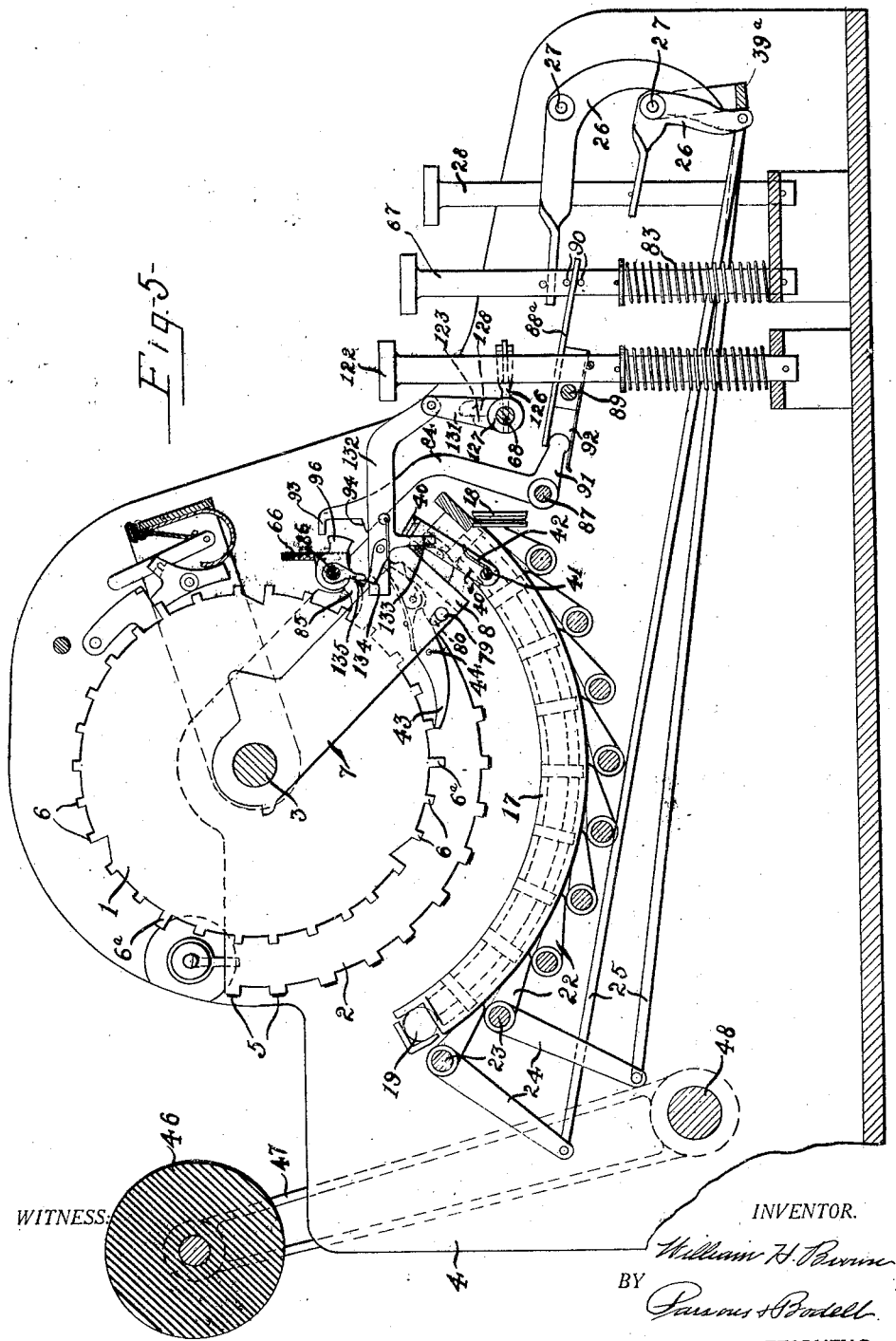

Figure 5 is a view similar to Fig. 4, taken on the plane of line 5—5, Fig. 3, showing the clearing and total key and parts operated thereby.

Figure 6:
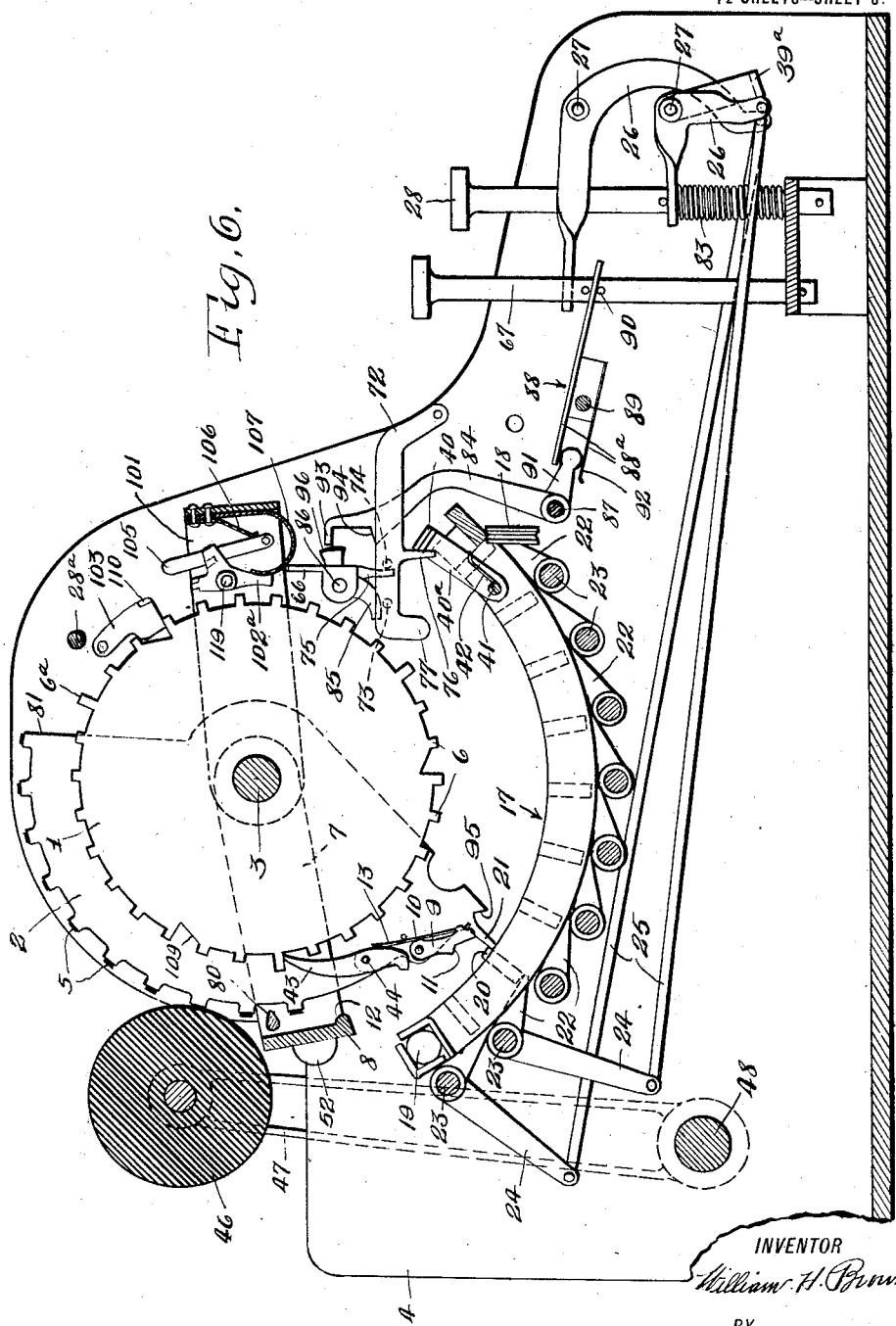

Figure 6 is a view similar to Fig. 4 showing the position of the computers and indicators at the end of a computing operation.

Figure 7:
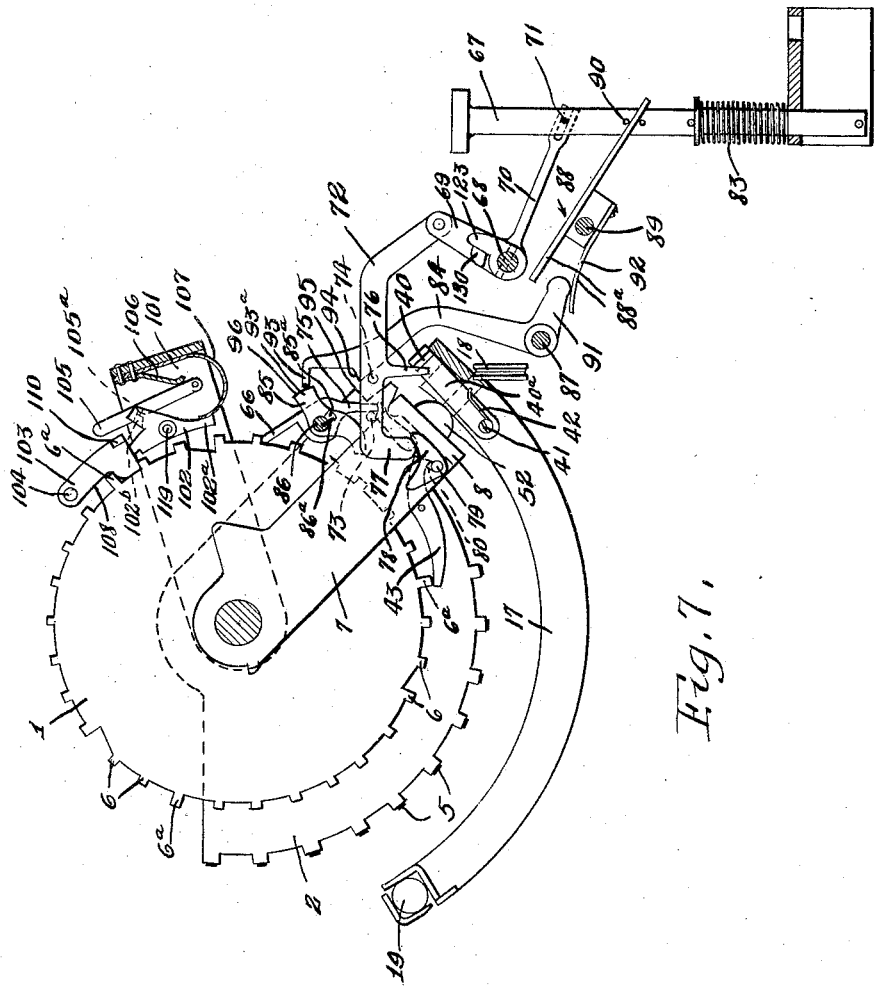

Figure 7 is a fragmentary detail view illustrating the operation of the totaling mechanism.

Figures 8 and 9 are respectively, an enlarged plan view, and side elevation partly broken away, of the carrying-over mechanism.

Figure 10 is a fragmentary plan view of the frame, stop carriage movable transversely thereof, and means for moving the carriage.

Figure 11 is a sectional view on lines 11—11, Fig. 10.

Figure 12:
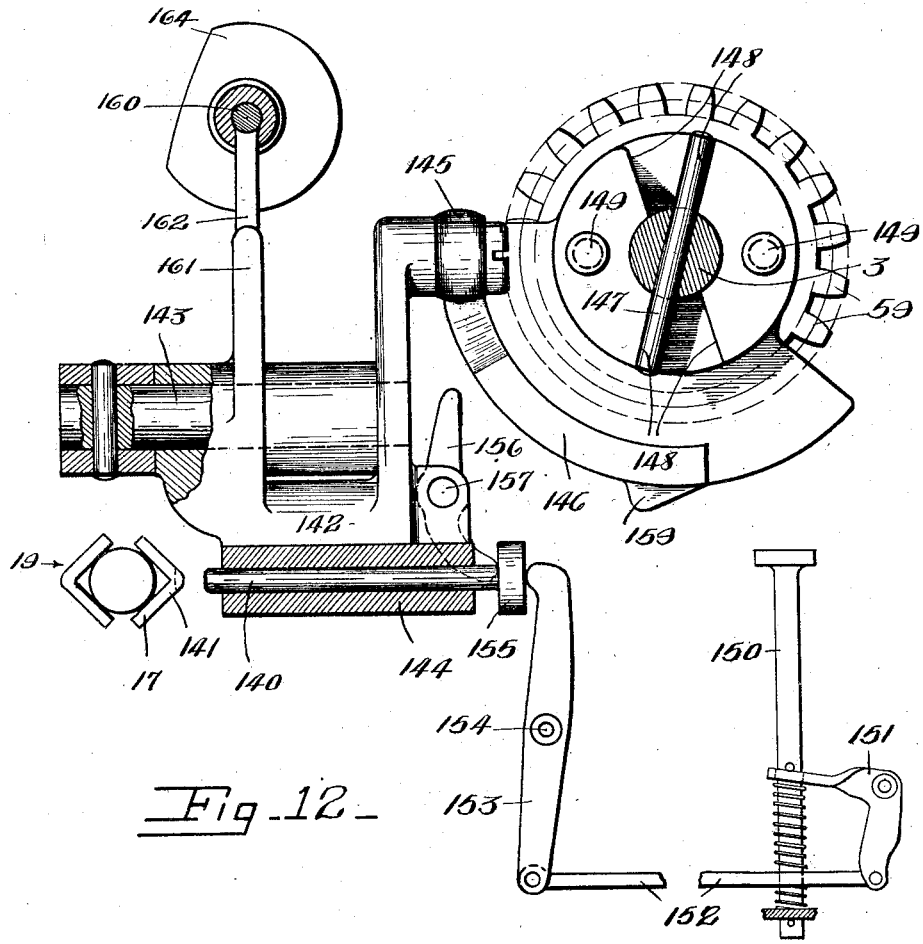

Figure 12 is an enlarged fragmentary sectional view on line 12—12, Fig. 3 illustrating a portion of the decimal setting mechanism.

Figures 13 and 14 are respectively, an elevation looking to the left in Fig. 12, and a plan view parts being omitted, of parts seen in Fig. 12.

This calculating machine comprises generally, calculating mechanism including a series of computer elements, a series of indicator or recorder elements paired with the computers, actuating means for the movable parts of the machine, means for controlling the extent of movement of the indicators by the actuating means, and means for transferring the movement of the indicators to the computers, and in addition carrying-over mechanism, total and clearing mechanism and decimal setting mechanism.

1 designates the computer elements, 2 the indicator elements, the elements of one series being paired with those of the other, and in the illustrated embodiment of my invention the indicator elements are arranged alternately with the computer elements and the movement of the elements of one series is transferred to the companion elements of the other series.

In the illustrated embodiment of my invention, the movements of the indicators are transferred to the companion computers, and both indicators and computers are loosely mounted upon a shaft 3 journaled in suitable bearings in the frame 4, and are held from lateral movement relatively to the frame, that is, axially of the shaft 3, the computers 1 being wheels which rotate and the indicators 2 being segments which rock with the shaft 3. The segments 2 are of greater radius than the wheels as clearly seen in Figs. 4, 5, 6 and 7, and have peripheral numbers at 5 from 0 to 9 inclusive on their peripheral edge. These numbers may be type and coact with printing mechanism to be hereinafter described.

The computers 1 have a series of peripheral teeth 6 from 0 to 9 inclusive and the wheels are of such size that each is provided with three series of teeth from 0 to 9 inclusive. One tooth 6ª of each series as the nine tooth is longer than the other teeth of the series for a purpose to be hereinafter described.

The actuating means coacts with the indicators, and the movements thereof are transferred to the computers, and this actuating means includes a member common to all of the indicators and having the same movement or extent of movement during each operation, and devices associated with each indicator 2 for detachably engaging or latching with the actuator so that when the particular indicator is stopped in its movement, as will be hereinafter set forth, the actuator can continue in its actuating movement and actuate other indicators which have not been stopped.

7 is the actuator which is here shown as a yoke or bail mounted on the shaft 3, which is a rock shaft, to rock therewith, said yoke being arranged astride the series of computers and indicators 2 so that its intermediate part 8 sweeps over the peripheral edges of the indicators.

The means for detachably connecting the actuator 7 to the indicators 2 as here shown, includes a friction pawl 9 pivoted at 10 to the margin of each indicator 2 and having an inclined or friction face 11 impositively or frictionally latching with a corresponding face on a rib 12 provided on the intermediate part 8 of the yoke 7. Each pawl is pressed into its operative position by a spring 13.

The means for controlling the extent of movement of the indicators 2 comprises a carriage 17, Figs. 1, 3, 4, 5, 6 and 10 movable along guides 18, 19 extending transversely of the frame 4, the carriage being normally arranged at one side, as the right side looking toward the back of the machine, of the series of computers and indicators, and shiftable laterally step by step under the computers and the indicators and a plurality of series of stops 20 supported by the carriage and corresponding in number to the number of indicators, there being one series of stops for each indicator. The carriage as shown is formed with an arc-shaped upper face, and the stops are shown as pins 20 movable radially with respect to the axis of the shaft 3 through the upper face of the carriage into position to be engaged by a shoulder 21 projecting radially from each indicator, these pins limiting the indicators in numerical positions from 0 to 8 inclusive. The pins may be actuated in any suitable manner and, as here shown, they are actuated by a rock arm 22 pressing on the lower ends thereof, these rock arms being mounted upon rock shafts 23 extending transversely of the frame beneath the path of the carriage and each having an arm 24 thereon which is connected by a rod 25 to an angle lever 26 mounted on a shaft 27 near the front of the machine, one arm of the angle lever being acted upon by one of the numeral keys 28. The indicators when moved to the limit of their movement and of the actuator 7, carry the numeral 9 to the printing line. They are stopped in this position by a rod 28$^a$ extending transversely of the frame 4 above the computers.

Figure 1:
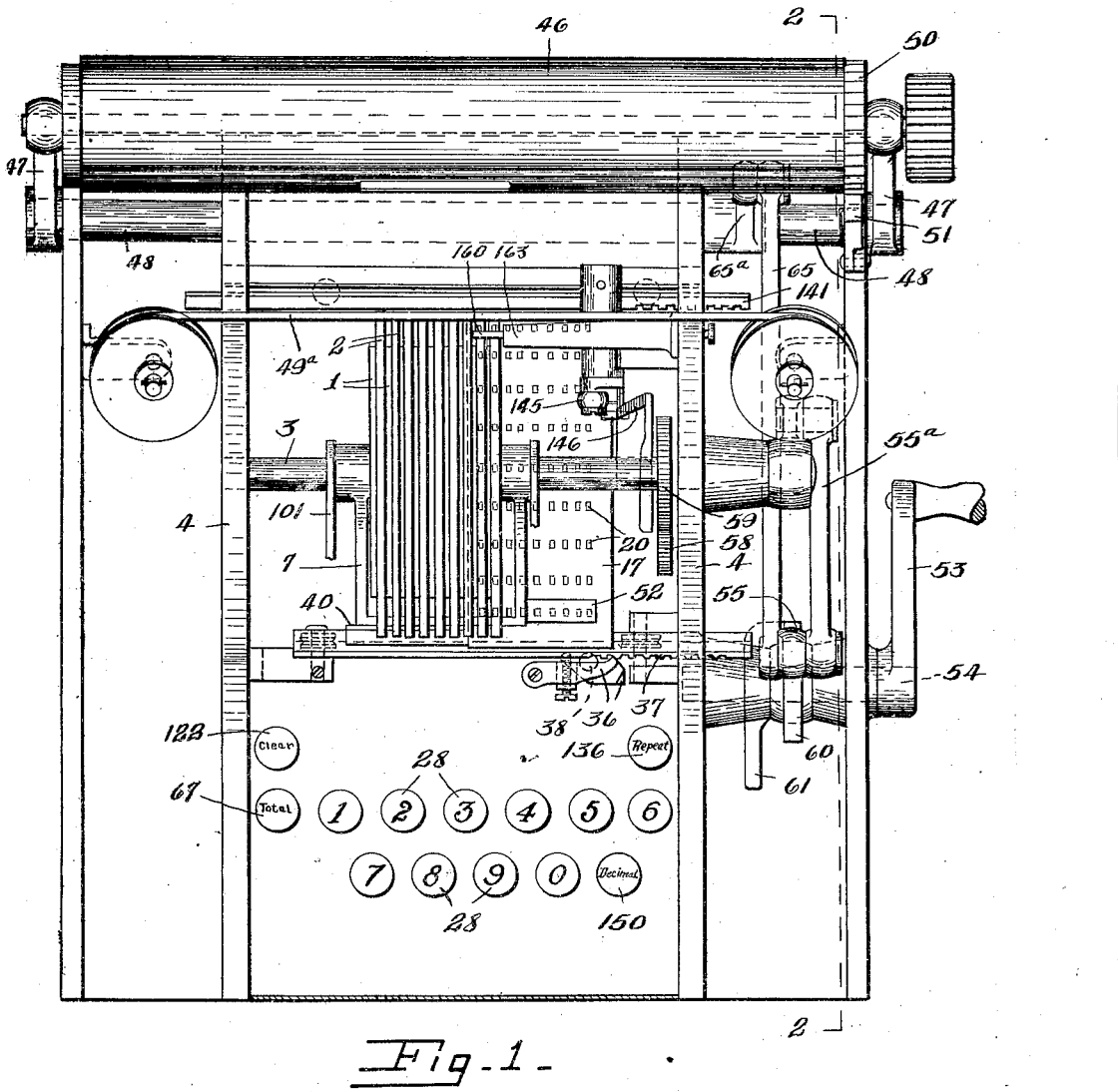
Figure 1 is a plan view, parts being omitted, of a machine embodying my invention.

There are ten numeral keys representing values from 0 to 9 inclusive as seen in Fig. 1 and upon the operation of any one of these keys the corresponding numerical stop 20 of the series alined with the rock arm 22 is moved upwardly above the face of the carriage. The key and stop mechanisms form no part of this invention. The nine key merely works the escapement so that the indicator in line with the series in which no stop 20 is set, moves to the limit of its movement against the stop 28$^a$.

The stop carriage 17 is normally arranged at one side, as the right side, of the series of computers and indicators 1, 2, as seen in Figs. 1 and 3, and is shiftable step by step, to the left to bring the series of pins or stops 20 one by one under the indicators 2 and the series of stops one by one over the series of rock arms 22 by means of which they are elevated. The carriage is shifted to the left along its guides 18, 19 by any suitable means as a rock shaft 29, Figs. 2, 10 and 11 journaled in suitable bearings carried at the right side of the frame 4 and having a rock arm 30 at one end which is connected by a link 31 to the carriage, and a spring 32 coiled about said shaft and anchored at one end to the frame at 32$^a$ and at its other end to the shaft or to a collar 34 fixed to the shaft. This collar has a rock arm 35 thereon which is arranged to be engaged by the actuating means for the purpose of rocking the shaft and tensioning the spring and also moving the carriage to the right at the end of each computing operation after it has been fed step by step to the left.

The step by step movement to the left of the carriage is controlled by escapement pawls 36, Fig. 3 which coact with a rack 37 on the carriage 17. The pawls are mounted on vertical rock shaft 38 which is connected by a link 39 to a universal bar 39$^a$ arranged to be actuated by one of the numeral keys. The escapement mechanism forms no part of this invention and any well known form of escapement may be used.

The indicators 2 are held from unintentional displacement by a stop 40, Figs. 4, 5, 6 and 7 movable with the carriage 17 and projecting to the left therefrom under the indicators with the exception of the decimal indicators, and here shown as a rod having an arm 40$^a$ at one end pivoted at 41 to the carriage 17, the rod being arranged in the path of the radial shoulders 21 of the indicators. When the indicators are in their starting position, the rod is pressed about the pivot 41 to its normal position by a spring 42, Fig. 4.

When a numerical key is depressed, the escapement pawls 36 are operated, the carriage 17 fed one step to the left carrying a row of stops 20 over the row of rock arms 22, and under the series of indicators 2 and during this movement of the carriage, the rod 40 moving therewith, shifts out from under the radial shoulder 21 of the indicator at the right disregarding for the time being the decimal indicators. During successive movements, additional rows of stops having one pin 20 set therein or none in case the nine key is pressed, move step by step to the left under the indicators 2 and in alinement with the indicators or the radial shoulders 21 thereof and the rod 40 moves laterally out from under the indicators and releases the indicators 2 successively.

The means for transferring the movement of the indicators 2 to the computers 1 as here illustrated, comprises a pawl 43 best seen in Figs. 4 to 7 inclusive, pivoted at 44 to each indicator or register 2 on the margin thereof beyond the periphery of the companion computer and in line with the peripheral teeth thereof, the end of the pawl being arranged to coact with such peripheral teeth of the companion computer, the pawl being pressed into engagement with such teeth by the spring 13 acting on the tail thereof. This spring is also common to the pawl 9 which connects the indicator to the actuator 7. During the movement of any indicator, the corresponding computer is correspondingly actuated by reason of the pawl 43 engaging the peripheral teeth 6 of the companion computer 1.

The indicators 2 are returned to their starting position by the intermediate part of the yoke 7 engaging the radially extending shoulders 21 of the indicators, as the shaft 3 on which the yoke is mounted, is rocked backwardly to its starting position. The advance movement of the indicators carries the type of the numbers to be set in the computers to the printing line where, during the operation of the shaft 3, a platen 46 carried by a pair of rock arms 47 which in turn are mounted upon a shaft 48 extending transversely of the frame at the rear end of the indicator, is moved toward the type of the indicators at the printing line, and presses the paper 49 on said platen against a ribbon 49ª overlying the type at the printing line. The platen may be fed to advance the paper in any suitable manner, and as here shown it is formed with ratchet teeth 50 coacting with the pawl 51 mounted on the frame 4, the pawl latching into engagement with the ratchet teeth during the forward movement of the platen and moving the platen about its axis during the rearward movement thereof. The ribbon and the printing mechanism form no part of this invention and any suitable printing mechanism may be employed.

The stops 20, which have been elevated, are depressed back in the carriage, after the carriage has been returned to its starting position, at the right of the series of indicators 2 and computers 1, and as here shown, they are depressed by means of a member 52, Figures 1, 3, 4, 5, 6 and 7, extending to the right from the yoke 7 and sweeping over the face of the carriage 17.

Figure 2:
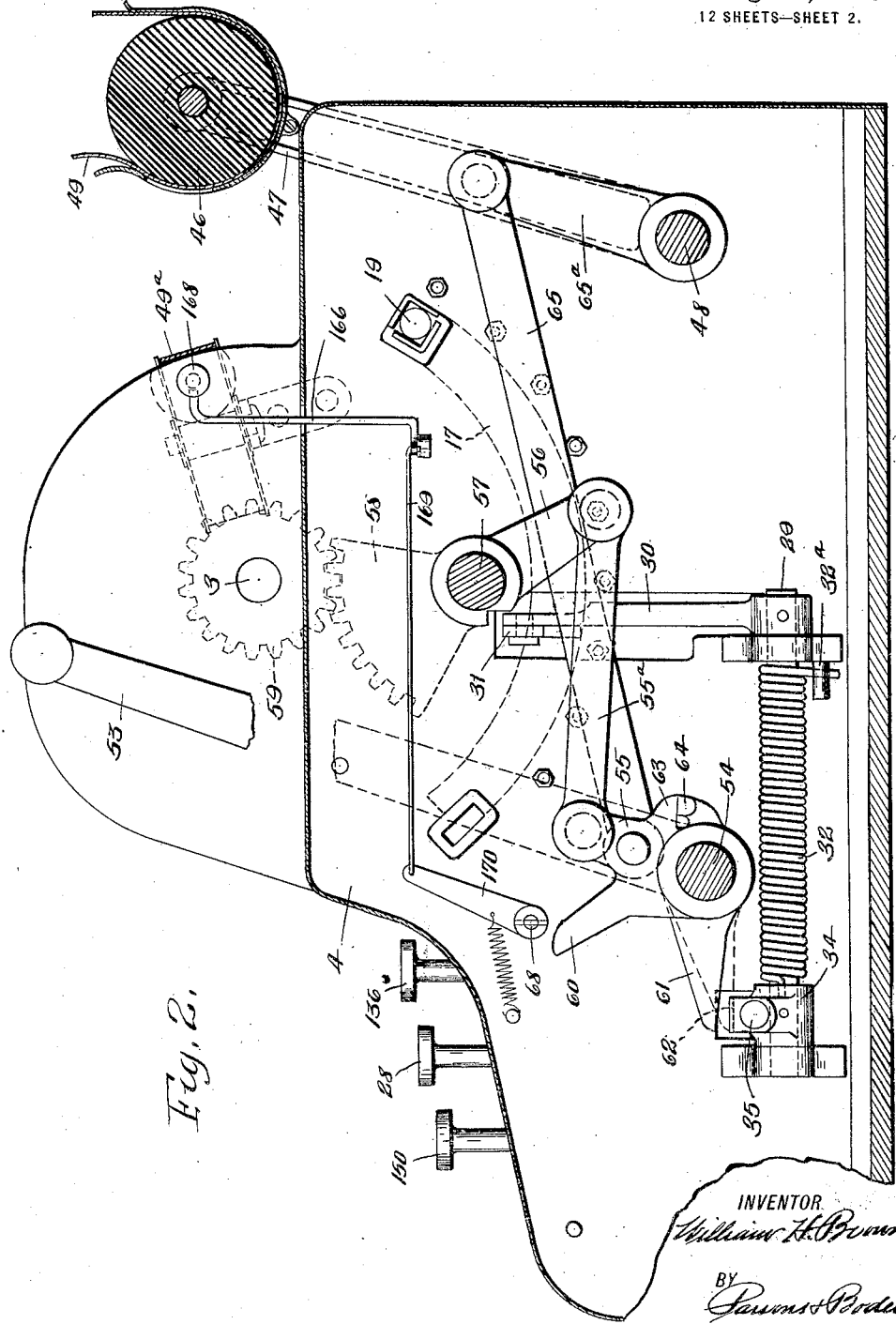
Figure 2 is a sectional view taken approximately on the plane of line 2—2, Fig. 1.

The shaft 3 is actuated by means, here shown as a hand lever 53, Figs. 1, 2 and 10 mounted on a rock shaft 54 journaled in the frame 4 on the right side thereof, the handle being connected by means of a rock arm 55 on the shaft 54 and a link 55ª to a rock arm 56 mounted on a stud or shaft 57 journaled in the frame on the right side thereof and on which is mounted a segment 58 which meshes with a gear 59 mounted on the shaft 3 and connected thereto by a lost motion connection for a purpose to be described in connection with the decimal mechanism.

The shaft 29 which serves to return the carrier 17 to the right to its starting position, is also actuated by this lever 53 or by an arm 60 extending from the hub of the arm 55 thereof, which arm moves into engagement with the rock arm 35 on the collar 34 on said shaft 29. As on account of decimal mechanism to be hereinafter described, the carriage 17 is pulled to the right two steps beyond the teeth of the rack 37 with which the escapement pawls 36 coact, means is provided for preventing movement of the carriage to the left by the spring 32, this means being here illustrated as a gravity pawl or detent 61, Figs. 1 and 2 loosely mounted on the shaft 54 and moving into a notch 62 in the collar 34. The pawl is lifted out of the notch 62 as the lever 53 approaches its forward or normal position by means of a shoulder 63 provided on the hub of the arms 55 and 60 and movable into engagement with the shoulder 64 on the tail on the pawl or detent 61.

The notch 62 is brought into alinement with the pawl or detent 61 after the shaft 54 has been rocked to tension the spring by the arm 60.

In operation, as thus far described, assuming that the number 825 (eliminating for the present, the idea of decimals), is to be added to a number accumulated in the computers, the 8, 2 and 5 keys are depressed in order, thus elevating the 8, 2 and 5 stops 20 of the first three rows of stops from the left on the carriage 17 and the carriage 17 feeds step by step to the left three steps. The handle 53 is then pulled forwardly causing the shaft 54 and parts thereon to rock, thus actuating the rock shaft 3 on which the computers 1 and indicators 2 are mounted. This rocking of the shaft causes the yoke 7 to move forwardly carrying three of the indicators 2 therewith which indicators have been released by reason of the moving of the rod 40 out from under the radial shoulders 21 thereon. These three indicators are actuated until they are limited respectively by the stops 8, 2 and 5 in alinement therewith and during their movement into engagement with the stops the pawls 43 engage teeth of the companion computers and correspondingly actuate said computers. Also, during the forward movement of the handle the platen 46 is moved to take a record on the paper through the link 65 connected to the hub 55 on the shaft 54, and to an arm 65$^a$ fixed to the shaft 48 on which arms 47 supporting said platen are mounted.

As the handle approaches the end of its throw forwardly, the arm 60 engages the arm 35 of the collar 34 on the shaft 29 and rocks said shaft to tension the spring and also to return the carriage 17 to the right to its starting position. During the rearward throw of the handle lever 53, the yoke 7 returns the indicators to their starting position in engagement with the rod 40 and also sweeps the member 52 across the face of the carriage 17, which is now in its starting position, and depresses the stops 20.

The total mechanism, in the illustrated form of my invention acts to hold the computers from movement and to limit the movement of the indicators in such positions that the numbers thereof at the printing line correspond to the total accumulated in the computers 1. The long teeth 6$^a$ of the computers are the stops for the indicators during this operation. The computers are locked from movement by a member 66, Figs. 3, 4, 5, 6 and 7, common to all the computers and engaging the teeth thereof and being normally out of engagement and movable into engagement therewith by connection between the total key 67 and said lock 66. These connections, as illustrated, include a rock shaft 68 extending transversely of the frame in front of and below the computers, see Figs. 3 and 7, an angle lever 69 on said shaft and having one arm 70 thereof connected at 71 to the shank of the total key 67 and having its other arm connected to a link 72 having shoulders 73, 74 thereon arranged to engage with lost motion front and rear sides of a tail or arm 75 on the lock 66. This link 72 also has means as a depending arm 76 for coacting with the stop 40 to depress the same against the action of its spring and out of the way of all the shoulders 21 of the indicators and with means as a downward projection 77 at its front end, Fig. 7 which coacts with a lever 78 mounted on a shaft 79, supported by the yoke 7 and having a cam 80 thereon arranged to engage the under side of the pawls 43 of the indicators and move said pawls so that they clear the short teeth of the computers and engage only the long teeth 6$^a$.

Hence, upon operation of the total key the lock 66 is moved into engagement with the teeth of the computers and the pawls 43 on the indicators shifted to engage only the long teeth 6$^a$ of the computers. Therefore upon the operation of the handle 53 and the shaft 3 the yoke 7 moves the indicators until their pawls 43 engage the long teeth 6$^a$ of the computers, so that further movement of the indicators is prevented and hence the numerals thereof are brought to the printing line corresponding to the numbers accumulated in the computers.

When the zero is present in a number to be added, the zero key is depressed and as no movement of the corresponding computer is necessary, although a movement of the corresponding indicator is necessary to bring the zero to the printing line, lost motion is provided between the indicator and its computer by arranging the pawls 43 so that they stop over the top of the teeth of the computers as seen in Fig. 4 and upon movement of the corresponding indicator into engagement with the zero or first stop 20 of the series of stops, this pawl 43 merely moves from one tooth of the computer to another and does not transmit any movement to the computer. Also when the nine key is depressed the indicators simply move to the limit of their movement until the advanced faces 81 of the indicators engage a fixed shoulder as the rod 28$^a$ extending transversely of the frame. The nine key operates no stop but merely works the escapement.

The total key 67 is operated against the action of a return spring 83, and after the handle 53 has been operated to take the total, the key 67 is released and the spring in lifting the total key, moves the link 72 to cause the shoulder 74 to engage the front side of the tail 75 of the detent 66 and move it out of engagement with the computers, and also to cause the arm 76 to move out of engagement with the stop 40 so that it can again move into position where it is engaged by the radial shoulders 21 of the indicators 2.

In order to hold from movement when taking the total, the indicators coacting with the computers in which no number is set, that is, the computers at the extreme left, means controlled by the computers is provided for locking such indicators after the rod 40 has been shifted by the operation of the total key out of its operative position.

As here illustrated, this means consists of detents 84 one for each indicator, said detents being operated by the total key and controlled by trailing pawls 85, one for each computer, mounted on the shaft 86 on which the detent 66 is for convenience also mounted. When a computer is actuated the companion trailing pawl 85 is also moved out of its normal position. The detents 84 are here shown as loosely mounted upon a shaft 87 extending transversely of the frame and as extending upwardly therefrom, there being one detent for each trailing pawl 85. Each detent 84 is connected to the total key 67 by suitable means as an arm 88 mounted on a shaft 89 extending transversely of the frame and coacting at 90 with the total key, and a plurality of arms 88$^a$, one for each detent, each having a fork coacting with the arm 91 on each detent. One side of the fork is made up of a spring 92, so that it may yield as shown in Fig. 7. Each detent 84 is provided with a hook 93 at its upper end for hooking over the tail 93$^a$ of the companion pawl 85 when the total key is operated, and the pawl is in its normal or starting position, and in so doing moves the shoulder 94 thereon under a shoulder 95 on the corresponding indicator. Hence, locking such indicator from movement.

In the event the computer corresponding to an indicator 2 has been moved from its starting position the trailing pawl 85 is shifted out of its normal position into that shown in Fig. 7 and thus shifts a shield 96 on the tail 93$^a$ thereof into the path of the hook 93 of the detent 84 as seen in Fig. 7 and thus prevents the locking of the corresponding indicator during the taking of the total, the spring 92 of any arm 88$^a$, that is, coacting with a detent 84 in the position shown in Fig. 7, yielding during this operation. The trailing pawls 85 are mounted on the shaft 86 by a lost motion connection here shown, Fig. 7, as a pin 86$^a$ working in a wide slot 85$^a$ in the pawls, thus the pawls can be moved from their normal position, Fig. 4, into their inoperative position, Fig. 7, without turning the shaft 86 on which the computer lock 66 is fixed, but can be returned to their normal position by the rocking of the shaft. The shaft is rocked by the clearing mechanism to be described. The trailing pawls 85 constitute controls (the detents 84) for locking from movement the indicators which coact with unused computers.

The carrying over mechanism between the computers may be of any suitable form, size and construction and it is here shown as a member common to all the computers and carrying over parts carried by said member and coacting respectively with the computers, and means operated by any one of said parts for connecting said member to the actuating mechanism of the machine.

101 designates the carrying-over member common to all the computers, this member being here shown as a yoke loosely mounted on the shaft 3. 102 designates the parts mounted on the member 101 and individual to the computers respectively. 103 are trippers as trailing pawls coacting respectively with the computers 1 and mounted on a rod 104 extending transversely of the frame above the computers. 105 are spring pressed latches coacting with the pawls 102 to normally hold the same out of operative position and 106 and 107 are springs pressing respectively on the latches 105 and the pawls 102.

In operation, as one of the long teeth 6$^a$ of a computer passes under the tripper 103 it engages the under face 108 thereof and lifts said tripper far enough to trip the latch 105 which holds the pawl 102 coacting with the computer 1 of next higher denomination, and this pawl 102 is then moved by its spring 107 into engagement with the teeth of the computer of next higher denomination so that when the yoke or member 101 is rocked, this pawl 102 so released will also engage the wheel of higher denomination. A long tooth 6$^a$ engages the detent 103 when 9 is accumulated in the wheel. When the computer of higher denomination to which a number is being carried has nine set therein, the deep notch 109 of such computer of higher denomination receives the pawl 102 permitting sufficient movement of said pawl 102 to allow it to engage a laterally extending shoulder 110 on the tripper 103 controlling the computer of the second higher denomination, and lifts it far enough to trip the latch 105 holding the pawl of second higher denomination so that the carrying over pawl 102 of the wheel of second higher denomination is permitted to engage its companion computer and actuate the same during rocking of the yoke 101. As the principle involved in the operation of carrying over parts 102, 103, 105 and in the deep notch 109 is well known to those skilled in the art and as the carrying over mechanism, per se forms no part of this invention, it is thought that further description is unnecessary.

The member 101 is normally disconnected from its actuating means to-wit, the shaft 3 or the yoke 7 and as before stated, it is connectable thereto or controlled in its connection thereto by any one of the members 102.

As seen in Fig. 9 it is connected thereto by a member as a lever 111 mounted on a stud 112 supported by one of the side arms of the member or yoke 101, the lever having one arm thereof provided with a projection 113 arranged to be engaged by a cam 114 on the contiguous arm of the yoke 7 and having its end 115 arranged in the path of a peripheral shoulder 116 on the hub of the adjacent arm of the yoke 7. The lever 111 is also formed with a forwardly projecting arm 117 arranged to be engaged by one arm of a lever 118 mounted on the shaft 119 on which the pawls 102 are mounted and having its other arm carrying a rod 120 extending crosswise of the member 101 under the arms of the pawls 102 which coact with the latches 105. This rod 120 is supported at its other end by a link mounted on the rod or shaft 119 and fixed thereto. The pawls 102 are loosely mounted on this shaft.

When any of the pawls 102 are released as just described, these pawls pressing on the rod 120, rocks the lever 118 or the rear end thereof upwardly so that it presses the arm 117 of the lever 111 upwardly carrying the end 115 downwardly into the path of the shoulder 116.

It does this as the latches 102 are released only when the computers 1 are in motion and when they are in motion the cam 114 has been moved away from the projection 113 of the lever 11 which projection holds the lever 111 with its end 115 out of the path of the shoulder 116 as seen in Fig. 9.

Hence, as the yoke 7 during this actuation of the indicators 2 approaches the end of its rearward movement, the shoulder 116 engages the lever 115 and causes the lever to cause the yokes 7 and 101 to move as a unit so that the pawl 102 which has been released will advance the companion computer 1. As the yoke returns to its starting position the cam 114 on the yoke engages the projection 113 on the lever 111 and resets the lever 111 and also the carrying over parts in their normal or inoperative position.

The yoke is locked from movement in order to prevent carrying over operation during the total taking and clearing operations by suitable means as a lock 97, Figs. 3 and 9, mounted on a vertical rock shaft 98 between its ends, said lock being arranged to swing under one arm of the yoke 101 and an arm 98$^a$ on the lower end of said shaft 98 connected by a link 99 to a rock arm 100 on the shaft 68, which shaft is operated by both the total and the clearing keys. The rod 120 not only resets or restores the pawls 102, but also normally holds the pawls 102 slightly beyond the position in which they are held by their individual latches 105, so that the tails 102$^a$ of said pawls 102 are in the path of the long teeth 6$^a$ of the computer. When the actuator or yoke 7 moves and shifts the cam 114 away from the projection 113 of the lever 111, the parts 102 are moved by their springs 107 until the shoulders 102$^b$ thereon take up the lost motion between them at 105$^a$ and the latches 105. This operation also lifts the tails 102$^a$ of the pawls 102 out of the path of the long teeth 6$^a$ of the computers.

The clearing mechanism comprises a key 122 which is connected to the shaft 68 to rock the same. The total key 67 and the clearing key are connected to the shaft in substantially the same way. As here illustrated the shaft 68 is provided with a rock arm 123 thereon, Fig. 3, and the clearing key 122 coacts with an arm 126 extending from a collar 127 on said shaft and having a laterally extending shoulder 128 arranged to engage or pick-up the arms 123 and rock the shaft 68 when the clearing key 122 is depressed, while the arm 70 coacting with the total key is mounted on a similar collar 129 loose on the shaft 68 and provided with a laterally extending shoulder 130 arranged to also engage or pick up the arm 123 and hence rock the shaft when the total key is operated.

The arm 69 which actuates the link 72 of the total mechanism is provided on the collar 169. The collar 127 is provided with an arm 131 similar to the arm 69 and said arm 131 is connected to a link 132, Figs. 3 and 5 extending over the indicator stop or bail 40 and having a depending arm 133 similar to the arm 76 of the link 72 of the total mechanism, this arm 133 serving to depress the stop 40 and release the indicators when the clearing key is depressed. The link 132 carries a spring pressed pawl 134 arranged to engage and push against an arm 135 on the shaft 86 during the return movement of the link 132 when the clearing key has been released and returned by its spring 122$^a$. The rocking movement of the shaft 86 returns the trailing pawl 85 to the normal position by reason of the key 86$^a$ and slot 85$^a$. The pawl 134 and arm 135 are arranged so that the nose of the pawl can ratchet or slip under the end of the arm 135 during the end of the return movement of the link 132 and after the trailing pawls 85 are in their normal engagement with the computers 1.

To repeat any number set in the indicators, that is, to perform a multiplying operation, means is provided for disconnecting the carriage 17 from the returning mechanism as the handle 53 and as here shown this is accomplished by moving the arm 35 out of the path of the arm 60 actuated by the lever 53.

As seen in Fig. 11, this arm 35 is shiftable into and out of the path of the arm 60 by means of a key 136 which coacts with the angle lever 137, one arm of which engages the key and the other arm of which engages the arm 35. By pressing downwardly on the key 136 the arm 35 is pulled to the left, Fig. 11, out of the path of the arm 60 and hence during the operation of the hand lever 53, the carriage 17 is not returned to its position to the right, and hence the stops 20 which have been set are not reset by the member or cam 52 as this member sweeps over the face of the carriage, only when the carriage is in its positon at the extreme right. Therefore, by holding out of the key 136 a number can be repeated as many times as desired. The key 136 is returned to its normal position by a spring 138 encircling the shank of the key and pressing at its upper end against a shoulder or pin 139 on the shank and at its lower end on one of the bearings for the key shank.

The first two computers 1 and indicators 2 at the right of the series are decimal elements and always compute, indicate or record decimal fractions, and the decimal computers and indicators 1ª and 2ª normally overhang the first two rows of stops at the left of the carriage 17 and are not normally held from movement by the stop or bail 40 which holds the remainder of the computers and indicators from movement by engaging radially extending shoulders 21 thereon but are held by a stop means to be presently described.

As the decimal computers and indicators overhang two series of stops and as the carriage 17 feeds laterally step by step during the setting of the stops, it is necessary, preliminary to each computing operation in which there is a decimal fraction, to return the carriage two steps to the right, and this is accomplished by connecting the carriage to the actuating mechanism operated by the handle 53. This connecting mechanism, best seen in Figs. 1, 3, 12, 13 and 14, comprises a clutch as a pin 140 shiftable into engagement with a rack 141 on the carriage 17 and being normally out connection with the rack and shiftable into engagement therewith by a decimal key, as will be hereinafter described. The rack 141 is provided with a sufficient number of teeth so that the pin and clutch 140 will take thereinto in any lateral position of the carriage 17, that is, whether the carriage 17 is in position occupied when the decimal fraction only is being computed, or is in its position occupied, a whole number of seven figures or less, and a decimal fraction is being computed, a whole number containing seven figures being the capacity of the machine illustrated.

This clutch member or pin 140 is carried by a power transmitting element actuated by some part which in turn is actuated by the handle lever 53. This power transmitting part consists of a lever 142 having a bearing between its ends mounted on a shaft or stud 143 carried by the frame and extending lengthwise thereof, the clutch pin 140 being slidably mounted in a guide or bearing 144 below the shaft 143 and the upper arm of the lever 142 having means as a roller 145 coacting with the cam 146 mounted on the shaft 3 on which the computers are mounted, this cam having a lift portion which tends to press the upper end of the lever to the left and hence the lower end thereof, which carries a clutch section, to the right and therefore move the carriage 17 to the right when it is connected to the lever 17 by the clutch pin 140.

This cam 146 is mounted on the shaft 3 by a lost motion connection here shown as a transverse key or pin 147 extending through the shaft 3 and having its end portions working between jaws 148 in the hub of the cam 146. The cam is connected to the gear 59 by keys or pins 149. The object of this lost motion is to permit the gear 59 to actuate the cam 146 and pull the carriage 17 two steps to the right before the jaws 148 of the hub of the cam 146 or the hub of the gear 59 pick up the pin 147 and actuate the shaft 3, and hence the yoke 7 which drives the indicators. In other words, this lost motion is for permitting the carriage 17 to be first placed in position before the computing operation takes place.

150 is a decimal key for operating the clutch pin 140, the motion of this key 150 being transferred to the pin 140 through an angle lever 151, one arm of which is connected to one end of a link 152, the other end of which link is connected to one arm of a lever 153 pivoted at 154 to the frame 4. The other arm of the lever 153 presses against the head 155 of the clutch pin 140. Obviously, as the key 150 is depressed the link 152 will be pulled forwardly and hence the clutch pin 140 pressed rearwardly so that it engages the rack 141 of the carriage 17.

The clutch pin 140 and decimal key 150 are restored to their normal positions by means of a shifting lever 156, Fig. 12, pivoted to the motion transmitting lever 142 at 157 and one arm thereof engaging the rear face of the head 155 of the clutch pin 140 and the other arm being arranged in the path of a projection or shoulder 159 on the periphery of the cam 146 and remote from the left of said cam 131. As before stated, the two decimal computers and indicators 1ª, 2ª are not held by the bail or stop 40 but they are normally held from movement by a shiftable stop 160, see Figures 3 and 12, extending transversely of the machine from the right side thereof extending over the upper edges of the decimal indicators 2ª so that said indicators can be moved about the shaft. However, when the decimal key 150 is operated to connect the carriage 17 to the power transmitting lever 142, said carriage during its feeding movement to the left when the numeral keys for the decimal fractions are depressed, shifts this lock 160 to the right and out of the path of the decimal computers and indicators 1ª, 2ª. This movement is accomplished by means of an arm 161 extending upwardly from the hub of the lever 142 and engaging a depending arm 162 on the stop 160. This stop 160 slides in a bearing 163 having a base 164 secured to the side piece of the frame 4 and the arm 161 depends through a slot in said bearing 163. A flat spring 165 is also mounted on the arm 161 and presses against the opposite side of the depending arm 162 to that on which the arm 161 presses, this spring serving to yieldingly return the stop 160 to its normal position and also to permit movement of the arm 161 during movement of the lever 142 when the stop 160 is held from return movement.

The stop 160 is also operable by the total key 67 and the clearing key 122 through a shifting lever 166 mounted on the frame and pivoted at 167 between its ends, one arm thereof coacting with the head 168 at the outer end of the stop 160 and the other arm thereof being connected by a link 169 to an arm 170 on a rock shaft 68, Figs. 3, 5, and 7. As either one of these keys is operated one of the rock arms or the other 70 and 126 will engage the rock arm 123 on the shaft 68 and cause the shaft 68 to be rocked and the shifting lever 166 to pull the stop 160 to the right out of the path of the decimal computers and indicators 1ª, 2ª so that these decimal elements can be actuated to take a total or clear the machine.

In operation, the numeral keys are depressed in the order of the numbers in the figures to be written, and during the pressing of any one key the escapement pawls 36 are operated and also one of the stops 20 of the row of stops in alinement with the levers 22 is elevated and the carriage 17 fed step by step to the right under the computers and indicators.

The handle 53 is then first pulled forwardly and then pushed rearwardly, the forward movement first causing the carriage 15 to be pulled two steps to the right in case a decimal fraction is set and then the yoke 7 to sweep over the face of the carriage 17 carrying the indicators in which numbers have been set therewith until the indicators are limited by the stops 20, previously set by the numeral keys, the indicators being released from this yoke (or indicator) 7 owing to the friction pawl 13 or similar mechanism such as shown in Figure 4.

During such movement of the indicators by the yoke 7 the motion is transferred to the computers 1 through the pawls 43. During the end of the forward movement of the handle 53, the arm 61 engages the arm 35 and returns the carriage 17 to the right to its starting position. During the rearward movement of the handle 53 the yoke 7 moves in the reverse direction and restores the indicators in their starting position and the wiper 52 sweeps over the face of the carriage 17 and depresses the stops therein.

As the lever 53 reaches its extreme rearward movement it releases the latch 61 which holds the carriage two steps to the right beyond its normal starting position so that the carriage is fed by the spring 32 two steps to the left where two rows of stops are under the decimal indicators 2ª. In this position, the carriage is stopped by the escapement and is thereafter controlled by the escapement. When the total is to be taken the total key 67 is depressed, thus releasing the indicators and locking the computers from movement and the handle 53 again actuated.

To clear the machine, the clearing key is depressed, thus releasing all the indicators and the computers so that when the handle 53 is pressed all the indicators can be moved to the full extent of their movement and the entire movement thereof transferred to the computers which are carried around until the long teeth 6ª come against the end of the carrying-over pawls 102.

For keyboard mechanism, carrying-over and clearing, and decimal, generally similar in principle to those shown herein, but differently arranged with respect to the computing mechanism, reference is made to my patents as follows:—

Patent No. 1,088,671, issued Feb. 24, 1914, recording machine; Patent No. 1,122,191, issued Dec. 22, 1914, recording and calculating machine; Patent No. 1,160,372, issued Nov. 16, 1915, decimal mechanism for calculating machines; Patent No. 1,167,332, issued Jan. 4, 1916, calculating machine; Patent No. 1,212,320, issued Jan. 16, 1917, calculating machine; Patent No. 1,214,886, issued Feb. 6, 1917, carrying over and clearing mechanism for calculating machines; Patent No. 1,285,014, issued Nov. 19, 1918, carriage operating mechanism for recording machines.

What I claim is:

1. In a calculating machine, the combination of a shaft, a series of computers, a series of indicators mounted on the shaft and movable about the same, the computers being arranged alternately with the indicators and being paired therewith, means for transferring the movement of the indicators in one direction to the computers, means for actuating the indicators, and means for controlling the extent of movement of the indicators, substantially as and for the purpose specified.

2. In a calculating machine, the combination of a shaft, a series of computers rotatably mounted on the shaft, and a series of indicators mounted to rock about said shaft, and being paired with the computers, means for rocking the indicators about the shaft and controlling the extent of movement thereof, and means for transferring the movement of the indicator elements in one direction to the computers, substantially as and for the purpose set forth.

3. In a calculating machine, the combination of a shaft, a series of computers and a series of indicators mounted on the shaft and paired with and arranged alternatively with the computers, means common to one series of elements for actuating the same, means for transferring the movement of the elements of said one series in one direction to the companion elements of the other series, and means for controlling the extent of the actuation of the elements of the former series, subsantially as and for the purpose described.

4. In a calculating machine, the combination of a shaft, a series of computers rotatably mounted on the shaft, a series of indicators mounted to rock about the shaft, and being paired with the computers, means mounted on the shaft to move therewith and common to all of the indicators for actuating the same, means for controlling the individual movement of the indicators in one direction, means for transferring the movement of the indicators in one direction to their companion computers, and means for rocking the shaft, substantially as and for the purpose specified.

5. In a calculating machine, the combination of a series of computers, a series of indicators alternating with the computers, the computers being formed with teeth and the indicators with pawls arranged to engage the teeth and transmit movement of the indicators in one direction to the computers, and means for coacting with the pawls of the indicator members to actuate the same, substantially as and for the purpose set forth.

6. In a calculating machine, the combination of a series of computers, a series of indicators arranged side by side, and alternating with the computers and extending beyond the edges of the computers, the computers having teeth, and pawls carried by the marginal portions of the indicators located beyond the edges of the computers, the pawls coacting with the teeth of the computers, means acting on the pawls to actuate the indicators, and means controlling the extent of movement of the indicators, substantially as and for the purpose described.

7. In a calculating machine, the combination of a shaft, a series of computers rotatably mounted on the shaft, a series of indicators mounted to rock about the shaft and being arranged alternately with the computers, said indicators being of greater radius than the computers, motion transmitting parts on the margins of the indicators and in the planes of the computers and coacting with the computers to transfer the movement of the indicators in one direction to the computers, means common to all of the indicators for actuating them in one direction, and means for controlling the setting of the indicators, substantially as and for the purpose specified.

8. In a calculating machine, the combination of a shaft, a series of computers rotatably mounted on the shaft, a series of indicators mounted to rock about the shaft and being arranged alternately with the computers, said indicators being of greater radius than the computers, pawls mounted on the margins of the indicators and in the planes of the computers and coacting with the computers to transfer the movement of the indicators in one direction to the computers, means common to all of the indicators for actuating them in one direction, and means for controlling the setting of the indicators, substantially as and for the purpose set forth.

9. In a calculating machine, the combination of a shaft, a series of computers rotatably mounted on the shaft, a series of indicators mounted on the shaft to rock about the same and being arranged alternately with the computer wheels and paired with the same, and also being of greater radius than the computer wheels, the computer wheels having peripheral teeth, motion transmitting parts mounted on the margins of the indicators in the planes of the companion computer wheels and coacting with the peripheral teeth thereof, a yoke mounted on the shaft to rock therewith, means for frictionally clutching the yoke to the indicators, means for determining the extent of movement of the indicators, and means for rocking the shaft, substantially as and for the purpose described.

10. In a calculating machine, the combination of a shaft, a series of computers rotatably mounted on the shaft, a series of indicators mounted on the shaft to rock about the same and being arranged alternately with the computer wheels and paired with the same, and also being of greater radius than the computer wheels, the computer wheels having peripheral teeth, motion transmitting parts mounted on the margins of the indicators in the planes of the companion computer wheels and coacting with the peripheral teeth thereof, a yoke mounted on the shaft to rock therewith, means for detachably clutching the yoke to the indicators and operable to release the yoke from any indicator when said indicator is stopped in its movement, means for determining the extent of movement of the indicators, and means for rocking the shaft, substantially as and for the purpose specified.

11. In a calculating machine, the combination of a series of computers, a series of indicators arranged alternately with the computers and being paired therewith, the indicators having margins thereof extending beyond the edges of the computers, means mounted on such margins and in the planes of the companion computers for transferring the movement of the indicators to the computers, an actuator common to all of the indicators to move the same in one direction, an automatically unlocking connection between the indicators and said common actuator whereby the actuator is freed of any indicator when said indicator is stopped in its movement, means for determining the extent of movement of the indicators, and means for returning the indicators in the opposite direction, substantially as and for the purpose set forth.

12. In a calculating machine, the combination of a shaft, a series of computers rotatably mounted on the shaft, and a series of indicators loosely mounted on the shaft and being paired with the computers, means for rocking the indicators about the shaft, means for transferring the movement thereof to the companion computers, means for limiting the movement of the indicators by the actuating means, and means detachably connecting the actuating means and the indicators whereby the indicators are released from the actuating means when said indicators are limited in their movement, substantially as and for the purpose described.

13. In a calculating machine, the combination of a frame, a shaft supported by the frame, a series of computers, and a series of indicators mounted on the shaft, alternately with the computers, means for transferring the movement of the indicators to the computers, means common to all of the indicators for actuating the same, a carriage supported by the frame and shiftable transversely relatively to the computers and the indicators, series of stops carried by the carriage for determining the setting of the indicators, there being one series of stops for each indicator, means for moving the carriage, and means for controlling the movement of the carriage and the setting of the stops, substantially as and for the purpose described.

14. In a calculating machine, the combination of a frame, a shaft supported by the frame, a series of computers and a series of indicators mounted on the shaft, and alternating with each other, means for transferring the movement of the indicators to the computers, means common to all of the indicators for actuating the same, comprising a member mounted on the shaft to rock therewith and having an arm arranged to sweep over the face of the carriage and having detachable engagement with the transfer means arranged to disengage when the companion indicator is stopped, a carriage supported by the frame and shiftable transversely relatively to the computers and the indicators, stops carried by the carriage for determining the setting of the indicators, there being one series of stops for each indicator, means for moving the carriage, and means for controlling the movement of the carriage and the setting of the stops, substantially as and for the purpose specified.

15. In a calculating machine, the combination of a series of computers, and a series of indicators held from transverse movement, a carriage movable transversely relatively to the indicators and the computers, and normally arranged at one side of the indicators, means carried by the carriage for controlling the setting of the indicators, means for moving the carriage step by step in one direction from one side of the indicators into a position opposite to the same, and bodily in the opposite direction, an actuator for the indicators, and means movable with the actuator for resetting the indicator controlling means after the carriage has been moved to its starting position, substantially as and for the purpose set forth.

16. In a calculating machine, the combination of a frame, a shaft journaled in the frame, indicators mounted on the shaft, a carriage supported by the frame and movable transversely thereof relatively to the indicators and normally arranged at one side of the recorders, series of stops supported by the carriage, there being one series for each indicator, means for feeding the carriage step by step in one direction into a position opposite to the indicator, and for setting the stops, means for shifting the carriage bodily in the opposite direction, a yoke mounted on the shaft to rock therewith and having means for coacting with the indicators to actuate the same, the yoke having means at one side of the indicators and arranged in position to sweep over the face of the carriage and reset the stops when the carriage is in its starting position, substantially as and for the purpose described.

17. In a calculating machine, the combination of a series of computers, and a series of indicators paired with the computers, means for actuating and controlling the extent of movement of the indicators, means for transferring the movement of the indicators to the computers, the computers and indicators having coacting means for stopping the indicators when the computers are locked, and a total mechanism comprising means for locking the computers from movement and bringing the coacting stopping means of the computers and indicators into coacting relation, whereby the same act limits the movement of the indicators by the actuating means, substantially as and for the purpose specified.

18. In a calculating machine, the combination of a series of computers, each having a total stop, a series of indicators paired with the computers, means for actuating and determining the extent of movement of the indicators, means for transferring the movement of the indicators to the computers, said means being arranged to also coact with the stops of the computers and total mechanism comprising means operable to lock the computers from movement and shift the transferring means in position to coact only with said stops, whereby the indicators are limited in their movement by the stops when moved by the actuating means, substantially as and for the purpose set forth.

19. In a calculating machine, the combination of a series of computers and a series of indicators paired with the computers, the computers having a series of short teeth and a long tooth, means for actuating and controlling the extent of movement of the indicators, means for transferring the movement of the indicators to the computers comprising a pawl associated with each indicator and coacting with the teeth of the companion computer, and means operable to lock the computers from movement and shift said pawls into position to clear the short teeth and engage only the long teeth of the computers, substantially as and for the purpose described.

20. In a calculating machine, the combination of a shaft, a series of computers rotatably mounted on the shaft, a series of indicators mounted on the shaft to rock about the same and arranged alternately with the computers and paired therewith, the indicators being of greater radius than the computers and the computers having a series of peripheral teeth including a long tooth, means for actuating and controlling the extent of movement of the indicators, means for transferring the movement of the indicators to the computers comprising a pawl mounted on the margin of each indicator and coacting with the teeth of the companion computer, and means operable to lock the computers from movement and to shift the pawl into position to clear the short teeth and engage only the long teeth, whereby when the computers are locked from movement, the movement of the indicators is limited by the long teeth of the computers, substantially as and for the purpose specified.

21. In a calculating machine, the combination of a series of computers and a series of indicators paired with the computers, the computers having a series of short teeth and a long tooth, an actuator common to all the indicators, key controlled stops for limiting the movement of the indicators by the actuator, means for detachably connecting the indicators to the actuator, means for transferring the movement of the indicators to the computers comprising a pawl associated with each indicator and coacting with the teeth of the companion computer, and means operable to lock the computers from movement and shift said pawls into position to clear the short teeth and engage only the long teeth of the computers, substantially as and for the purpose set forth.

22. In a calculating machine, the combination of a series of computers, and a series of indicators paired with computers, means for actuating and controlling the extent of movement of the indicators, means for transferring the movement of the indicators to the computers, and total mechanism comprising a lock common to all the computers, and a key connected to the lock for operating the same, substantially as and for the purpose described.

23. In a calculating machine, the combination of a series of computers and a series of indicators paired with the computers, means for actuating and controlling the extent of movement of the indicators, means for normally holding the indicators from movement, means for transferring the movement of the indicators to the computers, and total mechanism comprising means for locking the computers from movement whereby the same act to limit the movement of the indicators by the actuating means, the total mechanism also including a member for moving said indicator to release the indicators from such holding means, substantially as and for the purpose specified.

24. In a calculating machine, the combination of a series of computers, and a series of indicators paired with the computers, means for actuating and controlling the extent of movement of the indicators, means for normally holding the indicators from movement, means for transferring the movement of the indicators to the computers, and total mechanism comprising means for locking the computers from movement whereby the same act to limit the movement of the indicators by the actuating means, the total mechanism also including a member for moving the indicator holding means to release the indicators, and means operated by the total mechanism to lock from movement the indicators paired with the computers in which no numbers are set when the holding means releases the computers, substantially as and for the purpose set forth.

25. In a calculating machine, the combination of a series of computers formed with teeth, a series of indicators paired and arranged alternately and concentric with the computers, means for actuating and controlling the extent of movement of the indicators, means for normally holding the indicators from movement, means for transferring the movement of the indicators to the computers, and total mechanism operable to hold the computers from movement when the holding means is operated to release all the indicators, substantially as and for the purpose specified.

26. In a calculating machine, the combination of a series of computers, and a series of indicators paired with the computers, the computers being formed with a series of teeth, means for actuating and controlling the extent of movement of the indicators, means for normally holding the indicators from movement, a pawl normally engaged with the teeth of each computer and arranged to be moved out of engagement with its computer during the first advance movement of the computer, and total mechanism comprising a locking part common to all the computers, and means controlled by the pawls which remain in engagement with the computers, for locking from movement the indicators paired with the computers in which no numbers are set, substantially as and for the purpose set forth.

27. In a calculating machine, the combination of a series of computers, a series of indicators paired with the computers, means for controlling the movement of the indicators and including shiftable parts for transferring the movement of the indicators to the computers, total mechanism comprising a lock common to all the computers, a key for moving the lock into operative position, and a part arranged to normally coact with each computer and movable out of engagement therewith during the initial movement of its computer, and means operated by the total mechanism and coacting with and controlled by said parts for locking from movement the indicators paired with the computers not moved from their starting position, and means operated by the total mechanism for shifting said parts of the actuating means for the computers to permit movement of the indicators when the computers are locked, the computers having stops for coacting with said parts to limit the movement of the indicators when said parts are shifted, substantially as and for the purpose specified.

28. In a calculating machine, the combination of a shaft, a series of computers loosely mounted on the shaft, a series of indicators loosely mounted on the shaft and being paired with the computers, the indicators being formed with teeth, means for actuating the indicators, means for transferring the movement of the indicators to the computers paired therewith, means for normally holding the indicators from movement by the actuating means, a pawl normally coacting with the teeth of the computers, and being movable out of engagement therewith during the initial movement of the computer, and total mechanism comprising a lock movable into engagement with the computers to lock the same from movement, a shifter arranged to move said holding means for the indicators out of its initial position, and an additional lock arranged to coact with the pawls not shifted away from their companion computers in operative position, and be controlled thereby, said additional lock engaging the indicators paired with the computers in which no numbers have been set, to hold such indicators from movement during the total taking operation, substantially as and for the purpose specified.

29. In a calculating machine, the combination of a series of computers, and a series of indicators paired with the computers, means for actuating and controlling the extent of movement of the indcators, means for normally holding the indicators in their starting position, means for transferring the movement of the indicators to the computers, means for detachably connecting the indicators to the actuating means and clearing mechanism arranged to move the holding means for the indicators out of operative position whereby the indicators are moved by the actuating means to the extent of their movement, substantially as and for the purpose set forth.

30. In a calculating machine, the combination of a series of computers, and a series of indicators paired with the computers, means for actuating and controlling the extent of movement of the indicators, means for normally holding the indicators in their starting position, means for transferring the movement of the indicators to the computers, means for detachably connecting the indicators to the actuating means and clearing mechanism arranged to move the holding means for the indicators out of operative position whereby the indicators are moved by the actuating means to the extent of their movement, and a stop for limiting the movement of the indicators, substantially as and for the purpose specified.

31. In a calculating machine, the combination of a shaft, a series of computers mounted on the shaft, a series of indicators mounted on the shaft and paired with the computers, the indicators being of greater radius than the computers, pawls mounted on the margins of the indicators and coacting with the computers to transfer the movement of the indicators to the computers, an actuator common to all the indicators, each indicator having means for detachably engaging the actuator whereby when the indicator is stopped in its movement it is disconnected from the actuator during additional movement of the actuator, a stop for normally holding the indicators in their starting position, and clearing mechanism including means for shifting said stop out of its normal position whereby all the indicators are free, substantially as and for the purpose described.

32. In a calculating machine, the combination of a shaft, a series of computers mounted on the shaft, a series of indicators mounted on the shaft and paired with the computers, the computers having a series of teeth including a long tooth, the indicators being of greater radius than the computers, parts mounted on the margins of the indicators and coacting with the computers to transfer the movement of the indicators to the computers, an actuator common to all the indicators, each indicator having means for detachably engaging the actuator whereby when the indicator is stopped in its movement it is disconnected from the actuator during additional movement of the actuator, a stop for normally holding the indicators in their starting position, parts shiftable into position to be engaged by the long teeth of the computers, and clearing mechanism including means for shifting the stop out of its normal position whereby all the indicators are free and for controlling the movement of the last mentioned parts into the path of said long teeth, substantially as and for the purpose specified.

In testimony whereof, I have hereunto signed my name, at Syracuse, in the county of Onondaga and State of New York, this 14th day of February, 1920.

WILLIAM H. BROWN.